(12) United States Patent
Benner et al.

(10) Patent No.: US 8,220,236 B1
(45) Date of Patent: Jul. 17, 2012

(54) HARVESTER FOR SELECTIVELY CUTTING PORTIONS OF CROP MATERIALS

(75) Inventors: Jeffrey D. Benner, Salisbury, MD (US); Henry Thomas Oakley, Jr., Salisbury, MD (US); Paul Edward Tomaszewski, Delmar, MD (US)

(73) Assignee: Jeffrey D. Benner, Salisbury, MD (US)

( * ) Notice: Subject to any disclaimer, the term of this patent is extended or adjusted under 35 U.S.C. 154(b) by 41 days.

(21) Appl. No.: 12/833,236

(22) Filed: Jul. 9, 2010

Related U.S. Application Data

(60) Provisional application No. 61/224,207, filed on Jul. 9, 2009.

(51) Int. Cl.
*A01D 45/02* (2006.01)

(52) U.S. Cl. .......................................................... 56/63

(58) Field of Classification Search ................ 56/63, 62, 56/126–130, 14.9, 15.8
See application file for complete search history.

(56) References Cited

U.S. PATENT DOCUMENTS

| | | | | |
|---|---|---|---|---|
| 2,401,513 A * | 6/1946 | Schmidt | | 56/238 |
| 2,706,882 A * | 4/1955 | Thornton, Jr. et al. | | 56/13.7 |
| 3,508,387 A * | 4/1970 | Wright | | 56/95 |
| 3,596,448 A * | 8/1971 | Van Buskirk | | 56/63 |
| 3,841,072 A * | 10/1974 | Hudson | | 56/51 |
| 4,019,308 A * | 4/1977 | Quick | | 56/13.9 |
| 4,098,060 A * | 7/1978 | Quick | | 56/13.9 |
| 4,715,174 A * | 12/1987 | Lloyd et al. | | 56/297 |
| 4,897,986 A * | 2/1990 | Baker et al. | | 56/13.9 |
| 5,031,392 A * | 7/1991 | Baker | | 56/13.9 |
| 5,129,219 A * | 7/1992 | Baker | | 56/53 |
| 5,131,216 A * | 7/1992 | Otten et al. | | 56/56 |
| 5,379,577 A * | 1/1995 | Caillouet | | 56/14.3 |
| 5,485,716 A * | 1/1996 | Baker | | 56/14.3 |
| 5,816,036 A * | 10/1998 | Caillouet | | 56/63 |
| 6,076,340 A * | 6/2000 | Fowler | | 56/13.9 |
| 6,363,700 B1 * | 4/2002 | Fowler | | 56/13.9 |
| 6,745,550 B1 * | 6/2004 | Hinds et al. | | 56/13.9 |
| 6,869,356 B2 * | 3/2005 | Hinds | | 460/70 |
| 6,910,321 B2 * | 6/2005 | Hinds | | 56/63 |
| 7,681,388 B1 * | 3/2010 | Hinds et al. | | 56/126 |
| 7,694,501 B1 * | 4/2010 | Hinds et al. | | 56/63 |
| 7,805,916 B2 * | 10/2010 | Hinds et al. | | 56/62 |

* cited by examiner

*Primary Examiner* — Arpad Fabian-Kovacs
(74) *Attorney, Agent, or Firm* — Rosenberg, Klein & Lee (57) ABSTRACT

A harvester is provided for harvesting a plant similar to or like sorghum having a stalk and a grain head. The harvester includes a combine vehicle, a lower row crop cutter mechanism, and an upper grain cutter mechanism. The lower row crop cutter mechanism is mounted to a connecting portion of the combine vehicle for cutting plant stalks at a lower end of the plant. The upper grain cutter mechanism is coupled to a lower section of the combine vehicle and is vertically displaced from the lower row crop cutter mechanism for cutting the grain head at upper end of the plant simultaneously with the cutting of the plant stalk by the lower row crop cutter mechanism.

25 Claims, 10 Drawing Sheets

HARVESTER FOR SELECTIVELY CUTTING PORTIONS OF CROP MATERIALS

CROSS-REFERENCE TO RELATED APPLICATIONS

This Application claims priority to U.S. Provisional Patent Application Ser. No. 61/224,207, filed on 9 Jul. 2009.

FIELD OF THE INVENTION

The present invention is directed to a harvester. More specifically, the invention is directed to a harvester which simultaneously cuts and harvests both the tops and stalks of plants. A well known example of a plant having characteristics wherein the capture of both the tops and stalks of the plant is beneficial to various industries is the sweet sorghum plant. More particularly, the invention is directed to a harvester able to simultaneously harvest both grain and cane through one-pass harvesting as the harvester passes through a field. Further still, this invention is equipped to simultaneously harvest, separate, and transfer grains and canes to separate bins, trailers, or hoppers such that the grain may be delivered to a grain mill and the cane delivered to the appropriate processing facility.

BACKGROUND OF THE INVENTION

This invention pertains to harvesters and in particular to harvesters useful in the harvesting of the crop sorghum. Sorghum is a globally important plant as numerous sorghum species are used for food, fodder, the production of alcoholic beverages, and biofuels.

More specifically, sorghum is used as a staple of human nutrition all over the world. Globally, over half of all the sorghum used is used for human consumption. Sorghum, especially sweet sorghum, is a major crop for many farmers especially in the continents of Africa, Central America, and Asia. The grain from sorghum can be used for flours, porridges, distilled beverages, and specialty foods.

Sorghum is also a significant crop for feeding animals. In the United States, sorghum is used primarily as an animal feed; however, other uses are being developed constantly for this plant by a variety of industries. Sweet sorghum is also quite suitable for silage. Silage is fermented, high-moisture fodder which can be fed to cud-chewing animals such as cattle and sheep. Sorghum is fermented and stored in a process called ensilaging and is usually made from using the entire sorghum plant, not just the grain.

Sorghum can also be used in the textile industry for manufacturing wallboard, fences, biodegradable packaging material, and solvents. Dried sorghum stalks are often used for cooking fuel and die can be extracted from the plant for coloring textiles such as leather. More recently, sweet sorghum has been used to produce ethanol. Byproducts from ethanol production, such as sorghum-DDGS (distillers dried grains with solubles), are also finding a place in the global market.

Typically, wild sorghum is a tall plant ranging from 5 to 7 feet in height. Sweet sorghum has been bred to grow 8 to 15 feet tall. As discussed above, all parts of the sorghum plant provide useful purposes. The two most important structures of the sorghum plant are the grain head and the stalk.

Globally, the top sorghum producing countries are the United States (approximately 17% of global production), Nigeria, India, (each with approximately 14% of global production) and Mexico (approximately 11% of global production). Given the vast importance of this crop to the world, a need exists to efficiently and effectively harvest all parts of the sorghum plant in a single-filed pass.

The concept of a combine harvester, or simply a combine, is well known in the prior art. The combine harvester was invented in 1834 and early versions were pulled by horse or mule teams. In the early 1950s, the first self-propelled combine harvester was manufactured and it was capable of harvesting up to 5 tons of wheat a day. The self-propelled combine is still in use today and is typically powered by diesel or gasoline engines. In spite of all of these advances, however, the combine harvester has remained largely the same. Accordingly, even modern harvesters are unable to simultaneously harvest the grain tops and stalks of important plants such as the sorghum plant.

There has been a growing need to provide a harvester which can simultaneously harvest all portions of a plant in a single pass of a field. Thus, since different portions of a plant may be used for different industries, there is a growing need to provide a harvester which has the ability to cut various portions of a plant, sort those portions, and then transport those portions in an independent manner for individual users.

PRIOR ART

Combine harvesters are well known in the agricultural art. Typically, combine harvesters includes a header, which has a pair of blades for cutting crops, a series of conveyors for pulling the crops through the harvester, a thresher for separating the grain away from the stalks of the plant, and a blower for moving the grain into an accompanying hopper. These elements are found in almost every combine harvester, however, the conventional harvester is unable to simultaneously cut and collect two separate and distinct parts of a plant such as that found in the sweet sorghum plant.

Sweet sorghum or sugar cane harvesters known in the prior-art dehead, or cut off, the grain head leaving it to fall unused into the field. Such prior art systems do not harvest and collect the grain. In such prior art systems, harvesting of the sweet sorghum requires the harvesting mechanism to make an extra pass through the field for pre-harvesting the grain with an elevated combine. Such prior art mechanisms are costly and generally trample or crush some of the canes prior to harvesting.

Other prior art system for harvesting sorghum use rollers to crush the cane in order to extract the juice in the field. This prior art method exposes the sugar juice to bacterial contamination which may cause a loss of useable sugar content. Additionally the method can be particularly cumbersome due to the weight of the fluid that has to be handled in the field.

Prior art sorghum harvesters must include rollers which are relatively heavy and the liquid sugar juice make the mechanism and its storage tank extremely heavy which may cause compaction of the soil or rut formation. Storage of the large amount of sugar juice in large field tanks has been found to be cumbersome and expensive.

A further prior art method for harvesting is through the use of a silage or forage cutter, however, such prior art mechanisms shred and macerate the cane into small pieces which then expose the sugar juice to bacterial contamination.

Harvesting of the grain with such prior art techniques causes the user to drive through the sorghum field in at least two passes. Initially, a grain combine, which is elevated 9-11 feet above the ground, is used for harvesting sorghum grain heads followed by a later pass made with a sweet sorghum harvester to collect sorghum stalks or canes. This approach uses extensive amounts of fuel which results in added costs with respect to time and manpower.

Accordingly, as all parts of the sorghum plant are useful, a need exists for a combine harvester which can simultaneously cut or shear a sorghum head from the sorghum stalk such that the sorghum tops can be separated from its grain and the stalks collected for later use such as pressing for the production of biofuels and other useful products.

SUMMARY OF THE INVENTION

It is an object of the present invention to provide a harvester capable of cutting the stalk of a sorghum plant and the grain head of a sorghum plant simultaneously responsive to the positioning of multiple cutters coupled to a combine harvester vehicle.

It is another object of the present invention to provide a harvester adapted for separating grain from the grain head of a sorghum plant and collection of the cut sorghum stalk.

A further object of the present invention is to provide a harvester which will make the harvesting of sorghum a more efficient and less wasteful process.

It is a further object of the present invention to simultaneously harvest sorghum grain and stalk irrespective of sorghum plant height.

It is another object of the present invention to maintain the integrity of the sorghum stalks for collection and transportation for processing at an offsite facility.

It is another object of the present invention to provide for a harvester which includes a series of conveyors for transporting cut sorghum stalks to a collection hopper after sorghum stalks have been cut by a lower row crop cutter mechanism.

It is a further object of the present invention to obviate the need for multiple harvests due to the selective harvesting of either sorghum grain or sorghum stalk.

It is still a further object of the present invention to provide for a harvester that will segregate the collection of stalks from grain as separated from grain heads.

It is another object of the present invention to provide for a harvester which includes a plant positioning apparatus to ensure that the sorghum heads are cut from the stalk evenly as the harvester passes through a field.

It is also an object of the present invention to provide a harvester which includes an upper grain cutter that cuts sorghum grain heads and passes those grain heads to a thresher for separation of grain from the grain heads.

In overall concept, the harvester of the present invention is adapted for harvesting a plant having a stalk and a grain head. The harvester includes a combine vehicle and a lower row crop cutter mechanism that is mounted to a lower section of the combine vehicle for cutting a plant stalk at a lower position. The harvester further includes an upper grain cutter mechanism which is coupled to a lower section of the combine vehicle and is vertically displaced from the lower row crop mechanism such that the grain head of the plant can be cut at an upper end of the plant simultaneously with the cutting of the stalk at a lower end by the lower row crop cutter mechanism.

Additionally, the upper grain cutter mechanism of the harvester includes a height adjustment mechanism having a displaceable linkage mechanism which has one end mounted to a lower section of the combine vehicle and another end mounted to the upper grain cutter mechanism with at least one linkage bar positioned between each displaceable linkage mechanism. The displaceable linkage mechanism is displaceable in a rotary direction and is reversibly extendable along a longitudinal axis of the linkage bar. The height adjustment mechanism further includes a collection bin having an opening formed within its back wall. A blower is in open communication with the opening of the collection bin for receiving grain heads sheared off of crops to be displaced to a thresher mounted on the combine vehicle. The upper grain cutter mechanism further includes an auger assembly which is rotatably coupled to the sidewalls of the collection bin. The auger assembly includes an auger shaft and at least one auger blade for guiding the sheared grain heads through the opening formed within the collection bin.

These and other objects of the present invention will become apparent when considered in view of further description accompanying the Patent Drawings.

DESCRIPTION OF THE PREFERRED EMBODIMENTS

Figure 1:
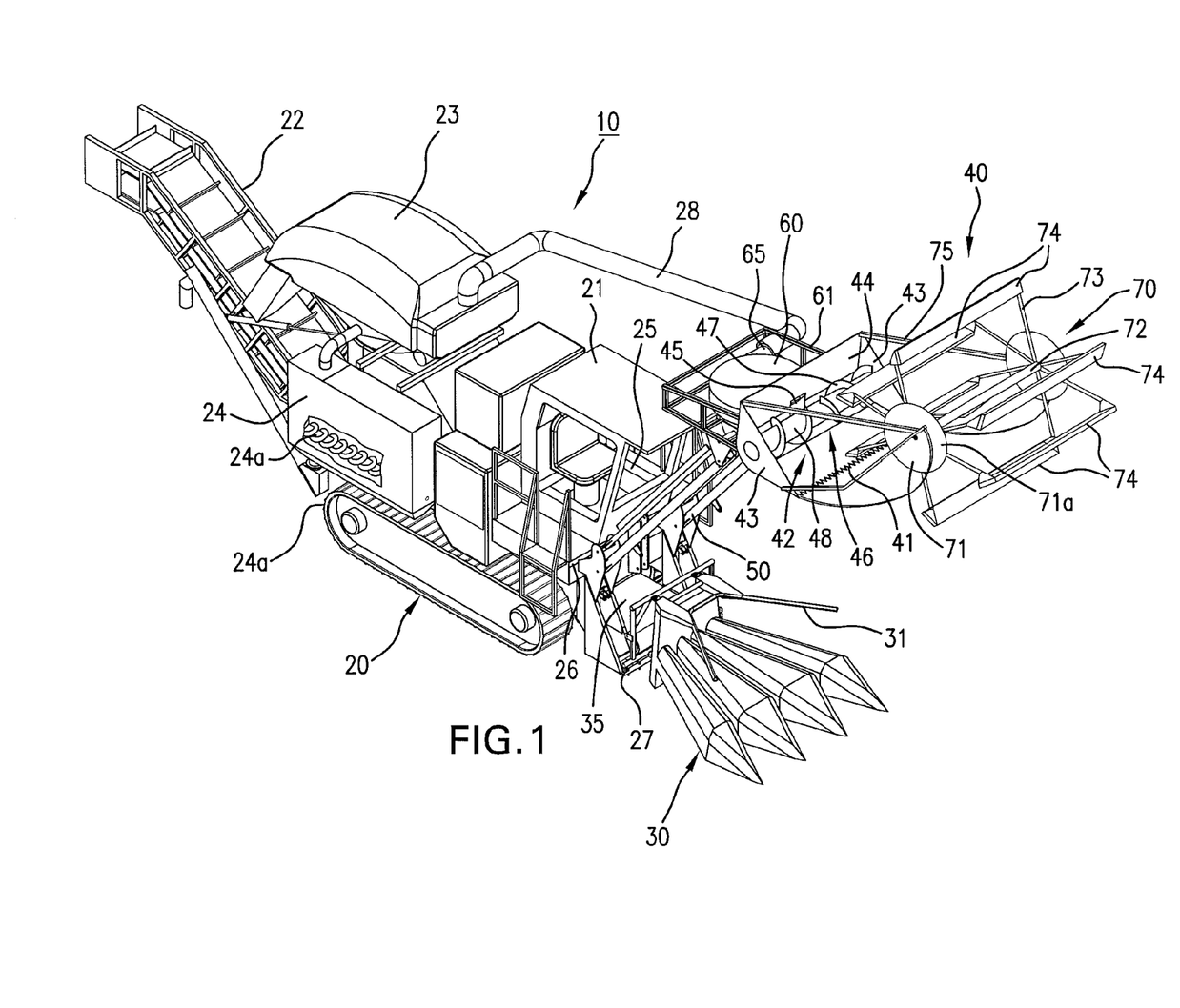
FIG. 1 is a perspective view of the harvester of the present invention.
Figure 2:
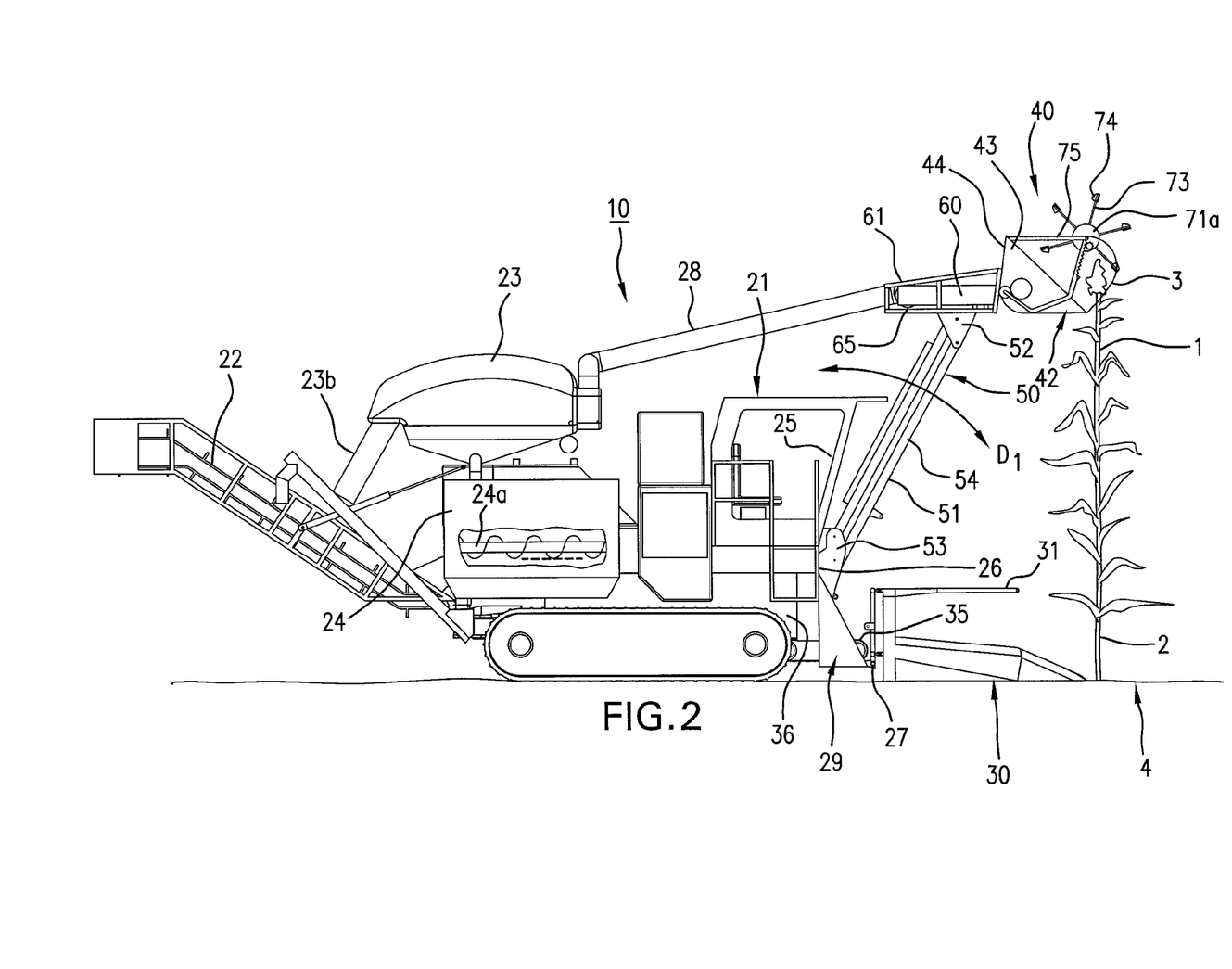
FIG. 2 is a side elevation view of the harvester of the present invention.
Figure 3:
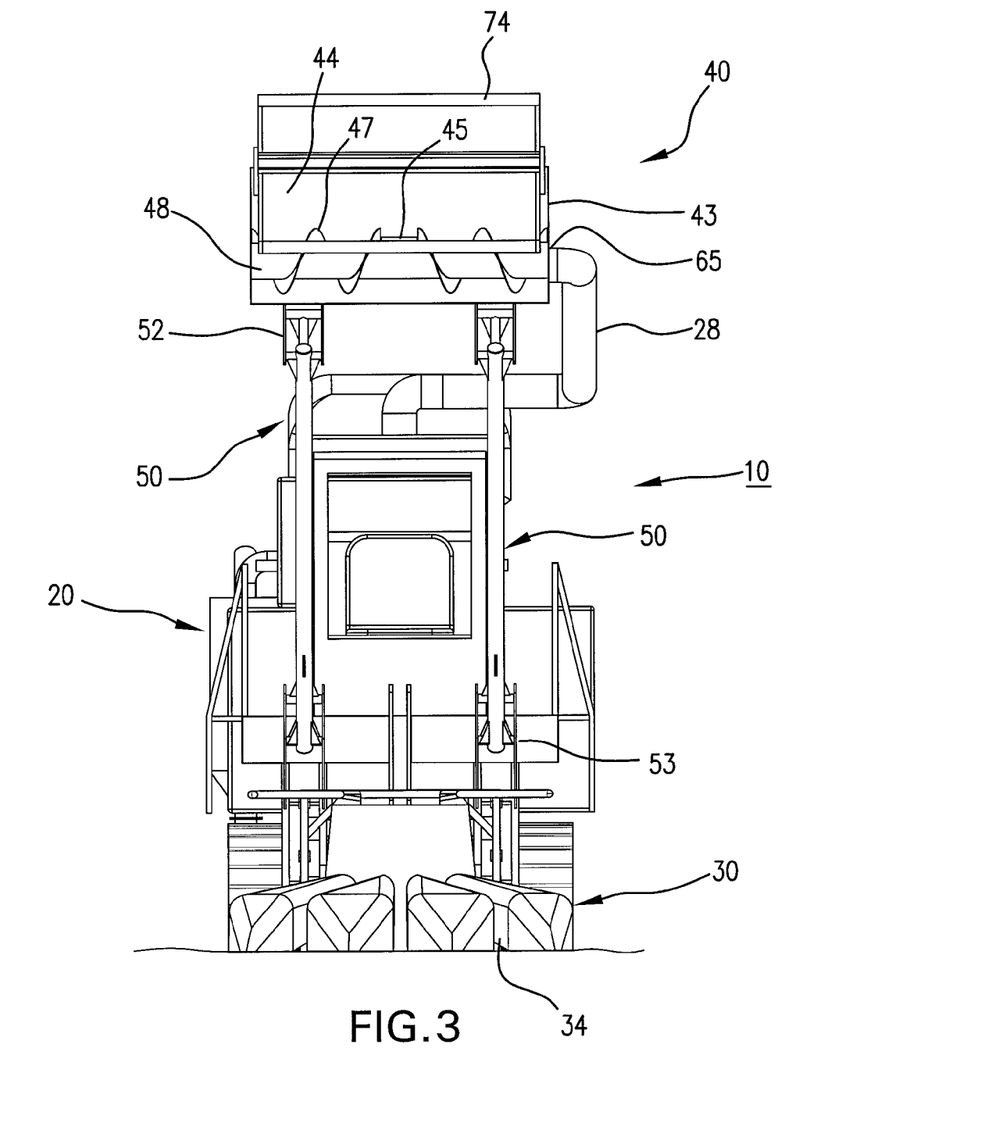
FIG. 3 is a front elevation view of the harvester of the present invention.

Referring now to FIG. 1, there is shown a harvester 10 adapted for the harvesting a plant 1 having a stalk or cane 2 and a grain head 3 (shown in FIGS. 2 and 3). The harvester 10 includes, among other things, a combine vehicle 20, a lower row crop cutter mechanism 30, and an upper grain cutter mechanism 40.

As is illustrated in FIG. 1, the combine vehicle 20 further includes a cabbed chassis 21, a main body discharge conveyor 22, a thresher 23, and a tassel collection hopper 24. Specifically, the cabbed chassis 21 may be one of many commercially available such as a D-4 CATERPILLAR chassis and engine; however, any similar combine vehicle 20 having a similar chasse and engine would be acceptable for the purposes of this invention. The cab 21 also includes a control room 25 for controlling the operation of the harvester 10 in its normal operating mode.

The thresher 23 is the threshing mechanism of the combine vehicle 20. The threshing mechanism typically includes rasp bars which are typically grooved steel bars. The rasp bars thresh or separate the grains and chaff from the grain head 3 through the action of a rotating threshing drum beating against a concave shaped half drum fitted with steel bars and a series of meshed screens 23a through which grain, chaff, and smaller debris may fall (seen more clearly in FIG. 7). The chaff passes along a series of conveyors toward the back of the combine vehicle 20 as the unwanted straw chaff tumbles from the back of the combine vehicle 20. A tractor with a trailer or hopper pulls alongside the combine vehicle 20 and the grain is collected in the hopper 80.

Lower row crop cutter mechanism 30 is coupled to the front of the combine vehicle 10 at a connecting section 27. The lower crop cutter mechanism 30 is a standard header or grain platform. In the embodiment shown, the invention has employed a 3-row grain platform; however, any grain platform which can be adapted to a combine vehicle 20 may be used. Generally, the width of the grain platform is directly proportional to the speed and efficiency with which a harvester 10 can cut a field. It is to be appreciated that different grain platforms are used for different crops. The lower crop cutter mechanism 30 is often hydraulically powered such that the grain platform can be raised, lowered, or angularly positioned from the cab 21.

Figure 8:
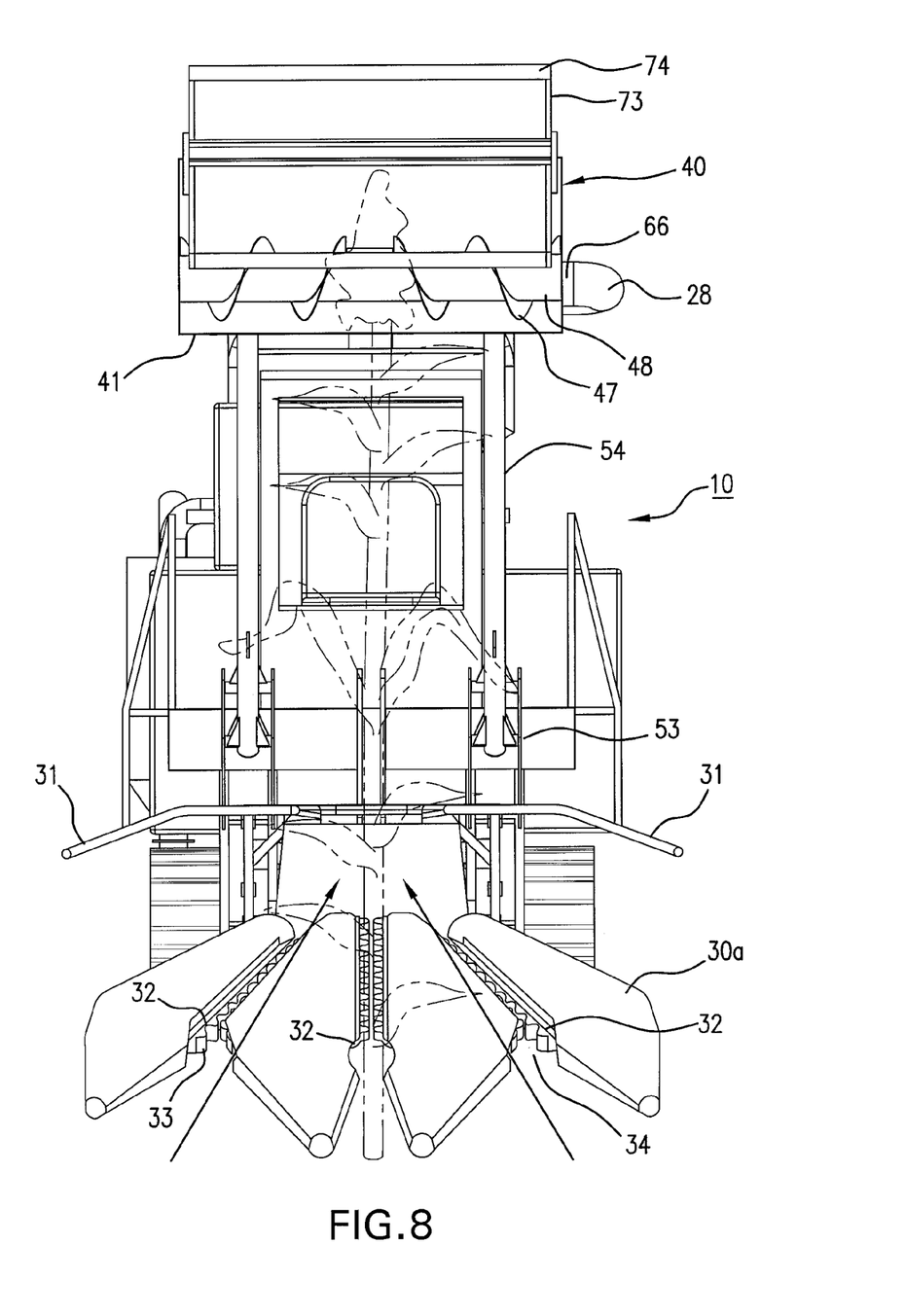
FIG. 8 is a frontal plane view of the lower row crop cutter mechanism and upper grain cutter mechanism of the present invention.

The lower crop cutter mechanism 30 is equipped with an oscillating knife bar 32 and grabbing chains 33 (seen in FIG. 8). The oscillating knife bar 32 will cut the stalk or cane 2 at a predetermined position. The stalks or canes 2 will be guided into the cutting channels 34 of the lower row crop cutter mechanism 30 by the guide bars 31. Once the stalk or cane 2 is guided into the cutting channels 34, the grabbing chains 33 secure the cane pulling it towards the oscillating knife bar 32.

Following the cutting of the stalk or cane 2, the stalk or cane is pulled into the belly of the feeder throat or feeder house by a plurality of pinch rollers (not shown) located directly behind the lower row crop cutter mechanism 30. Once the stalk or cane 2 has entered the feeder house 36, the stalk or cane 2 is carried on a series of conveyors 35 located at the bottom of the combine vehicle 20. A rotating knife (not shown) will slice the stalk or cane 2 into 6-8 inch sections called billets. The billets are in turn carried out of the main body discharge conveyor 22 into a dump wagon or hopper 80 pulled by a tractor running along side the combine vehicle 20 as the combine vehicle 20 moves through a field.

Further shown in FIG. 1 is the upper grain cutter mechanism 40. The upper grain cutter mechanism 40 is coupled to a lower section 26 of the combine vehicle 20. A height adjustment mechanism 50 is shown and is mounted on opposing ends to the lower section 26 of the combine vehicle 20 and the upper grain cutter mechanism 40. FIG. also shows a blower 60 coupled to the upper grain cutter mechanism 40 and in communication with the thresher 23 through a conduit 28.

As is more clearly recited in FIG. 2, the harvester 10 of the invention is designed such that the upper grain cutter mechanism 40 and the lower row cutter 30 simultaneously cut the grain head 3 of a plant 1 and the stalk or cane 2 of plant 1. It is important to the invention that the upper grain cutter mechanism 40 have a height adjustment system 50. The height adjustment mechanism 50 is necessary to ensure that plants 1 of all heights can have both the grain head 3 and stalk or cane 2 simultaneously harvested.

The height adjustment mechanism includes a displaceable linkage mechanism 51 mounted on opposing ends of the lower section 26 of the combine vehicle 20 and the upper grain cutter mechanism 40. The displaceable linkage mechanism 51 includes an upper vehicle bracket 52 and lower vehicle bracket 53 with at least one linkage bar 54 disposed between the upper vehicle bracket 52 and lower vehicle bracket 53 respectively. Upper and lower vehicle brackets 52, 53 may be one of many commercially available industrial grade mounting brackets. The only requirements for upper bracket and lower bracket 52, 53 is that the upper bracket and lower bracket 52, 53 be able to sustain the weight bearing loads of the upper grain cutter mechanism and that the brackets 52, 53 be positionable such that the height adjustment mechanism 50 can be displaced in a rotary direction $D_1$.

The upper vehicle bracket 52 is coupled to the blower housing frame 61. The blower housing frame can be any structure adapted for sustaining the weight bearing loads of the blower 60 and the upper grain cutter mechanism 40. It is a further requirement that the blower housing frame 61 be adaptable for securement to an industrial grade bracket such as upper bracket 52. In a preferred embodiment, the blower housing frame 61 is a steel cage structure permissible for the attachment of various tubing and components such as conduit 28 and upper cutter mechanism 40 respectively.

The lower vehicle bracket 53 is coupled to a lower section 26 of the combine vehicle 20. The lower section 26 of the combine vehicle 20 may also be coupled to a mounting block 29. The mounting block 29 can be any mechanism adapted for the mounting of a connecting section 27 for a lower row crop cutter mechanism 30, a height adjustment mechanism 50, or both. In a preferred embodiment, as is further illustrated in FIG. 2, the height adjustment mechanism 50 and the connecting section 27 of the lower row crop cutter mechanism 30 may each be coupled to opposing ends of the mounting block 29 of the combine vehicle 20.

Positioned between upper vehicle bracket 52 and lower vehicle bracket 53 is a displaceable linkage mechanism 51 including at least one linkage bar 54. The linkage bar 54 can be a single linkage bar or a multi-linkage bar system. In one embodiment, the linkage bar is a 4-bar linkage system coupled to two upper vehicle brackets 52 and two lower vehicle brackets 53. It is envisioned that in a 4-bar configuration, a pair of upper vehicle brackets 52 will be mounted to the blower housing frame 61 such that each of the upper vehicle brackets are positioned parallel with respect to the other. Likewise, in employing a 4-bar configuration, a pair of lower vehicle brackets 53 will be mounted to the lower section 26 or the upper end of the mounting block 29 of the combine vehicle 20 such that each lower vehicle bracket 53 is positioned parallel with respect to the other. It should be recognized that the height adjustment mechanism 50 could work with a single upper vehicle bracket 52, a single linkage bar 54 and a single lower vehicle bracket 53. Linkage bar 54 may be formed from any standard industrial grade material strong enough to withstand the weight bearing loads of the upper grain cutter mechanism, the blower housing frame 61, the blower 60 and upper vehicle bracket 52.

In a preferred embodiment, linkage bar 54 is reversibly extendable along its own longitudinal axis. It is further envisioned that in this preferred embodiment, the reversible extendibility of the linkage bar 54 may be a hydraulically actuated or piston driven system. Such a reversibly extendable arrangement further ensures that the grain heads 3 of the plant 1 are simultaneously cut by the upper grain cutter mechanism 40 and the stalk or cane 2 by the lower row crop cutter mechanism 30 irrespective of plant height. While it is envisioned that the linkage bar will be extended and contracted by a hydraulically actuated mechanism, the height adjustment mechanism 50, and in particular the displaceable linkage mechanism 51, should not be limited to hydraulic systems as any reversible extension system would meet the purposes and objectives of this invention.

Similarly, in a preferred embodiment, lower row crop cutter mechanism 30 is also envisioned to be vertically displaceable with respect to the ground 4. Such a configuration will accommodate for the selective positioning of the lower crop cutter mechanism 30 so that the user of the harvester 10 can cut the stalk or cane 2 of the plant 1 at a desired location near the bottom of the plant 1.

Referring to FIGS. 1-7, combine vehicle 20 is coupled to an upper grain cutter mechanism 40. Upper grain cutter mechanism 40 includes a sickle mower 41. Sickle mower 41 includes blades which shear the grain heads 3 from the plants 1. As the grain head 3 is sheared from the plant 1 by the cutter blades 41, the grain head 3 is received within a collection bin 42. The collection bin 42 of the upper grain cutter mechanism 40 includes sidewalls 43 and back wall 44. Back wall 44 of collection bin 42 includes an opening formed within it. Further coupled to the back wall 44 of the collection bin 42 is the blower housing frame 61. In a preferred embodiment, the collection bin 42 of the upper cutter mechanism 40 is coupled to the blower housing frame 61 by welding. Other known methods of attachment not discussed herein may be employed so long as the method of coupling the collection bin 42 to the blower housing frame 61 does not interfere with the overall working concept of the upper grain cutter mechanism 40 specifically or any other element of the harvester 10 generally.

The upper grain cutter mechanism 40 further includes an auger assembly 46. The auger assembly 46 is rotatably coupled to the sidewalls 43 of the collection bin 42 of the upper grain cutter mechanism 40. The auger assembly 46 includes at least one auger blade 47 and an auger shaft 48 with the auger shaft 48 including at least one auger blade 47 positioned thereon. The auger system 48 is a device for moving material by means of a rotating helical flighting. The material, in this case the grain heads 3 of a plant 1, is moved along the axis of rotation. Grain augers are typically used in agriculture to move grain from trucks and grain carts into grain storage bins; however, in this instance, the auger system 48 is being used for driving the grain heads 3 of the plants 1 through the opening 45 of the collection bin 42. Grain auger 48 is coupled by its shaft to each opposing end of the sidewalls 43 of the collection bin 42.

Figure 6:
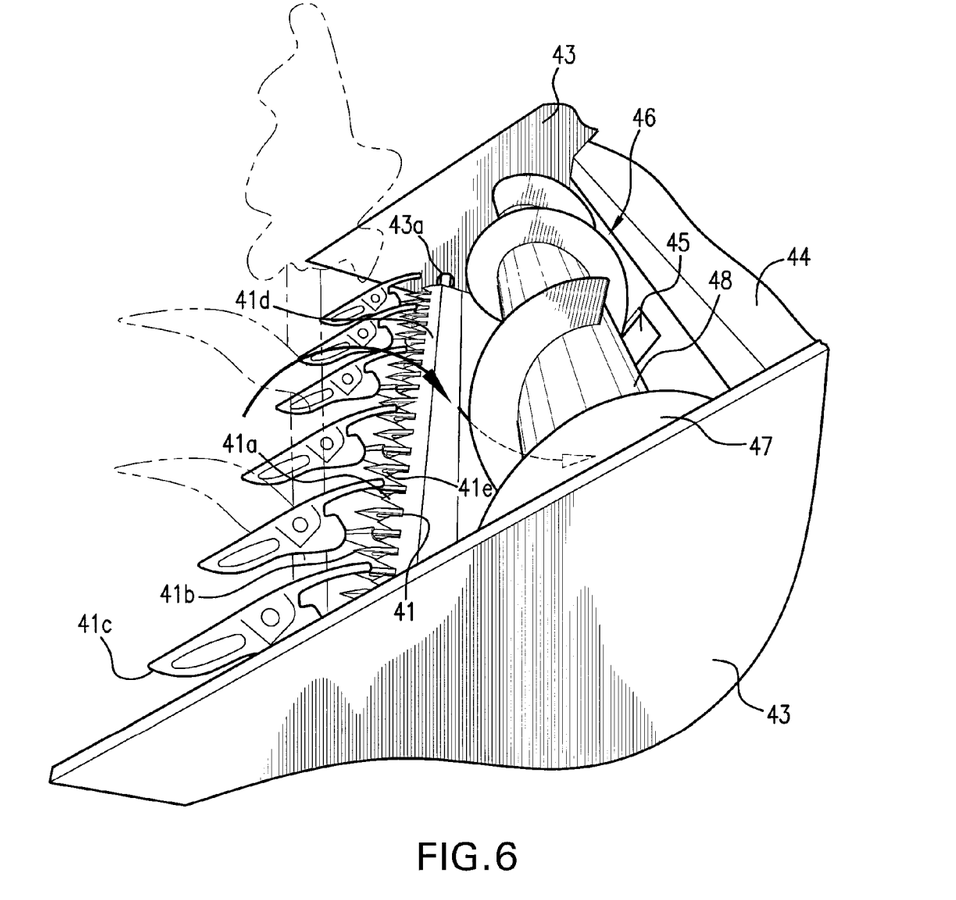
FIG. 6 is an enlarged perspective view of the upper grain cutter mechanism of the present invention.

As is clearly seen in FIGS. 1, 3, and 6, auger blades 47 are contoured to guide the grain heads 3 into the opening 45 formed through back wall 44 of the collection bin 42. Thus, by helically forming auger blades 47 with a different helical formation on auger shaft 48, the grain heads 3 of the plant 1 are ensured to pass into the blower opening 45.

Further shown in FIG. 1, the upper cutter mechanism 40 may also include a plant positioning mechanism 70. The plant positioning mechanism 70 includes a revolving reel 71. Revolving reel 71 has a crossbar 72 as a central axis. In a preferred embodiment, crossbar 72 is cylindrical; however, any geometric configuration for the crossbar 72 will sufficiently meet the purposes and objectives of this invention. Projecting outwardly from the crossbar 72 are a plurality of spindles 73. Spindles 73 may project from the crossbar 72 at the center of the crossbar 72 or spindles 73 may be arranged in pairs such that each pair of spindles projects in parallel from opposing locations at each end of the cross bar 72. Coupled to each spindle 73 are paddles 74. Revolving reel 71 is coupled to the collection bin 42 by a pair of plant positioning connection rods 75. Plant positioning connection rods 75 project outwardly from the collection bin 42 of the upper grain cutter mechanism 40 and connect to the outer walls of the revolving reel 71a. As shown in FIGS. 1 and 2, a plurality of plant positioning connection rods are coupled to each outer wall 71a of the revolving reel 71 for securement of the plant positioning mechanism 70 to the upper grain cutter mechanism 40; however, the number of plant positioning connection rods 75 necessary to secure the plant positioning mechanism 40 to the upper grain cutter mechanism 40 could be as few as 1 connection rod 75 connected to each outer wall 71a of the revolving reel 71.

As can be seen in FIGS. 2, 4-5 and 7-9, the revolving reel 71 of the plant positioning mechanism 70 is rotatable in a clockwise direction $D_2$ such that the paddles 74 are rotatable about the central axis of the revolving wheel 71 for placement of the grain heads 3 of the plants 1 in a position that aligns the grain heads 3 with the blades of the sickle mower 41. Once the grain head 3 of the plant 1 has been pushed into the sickle mower 41 by the paddle 74 of the revolving reel 71, the remainder of the plant 1, including the stalk or cane 2 can be cut and harvested by the lower row crop cutter mechanism 30.

It is envisioned that each of the aforementioned elements, including but not limited to the main body discharge conveyor 22, the thresher 23, the tassel collection hopper 24, the hopper disk charge screw 24a, the mounting block 29, the lower row crop cutter mechanism 30, the upper grain cutter mechanism 40, the height adjustment mechanism 50, the auger assembly 46, the blower 60 and the plant positioning mechanism 70 are powered by either an electric motor, through the power take-off of the combine vehicle 20 itself, or an internal combustion engine mounted to some or all of the aforementioned components.

As can be seen in different perspectives in FIGS. 3, 8-10, the upper grain cutter mechanism 40 is vertically displaced from and in substantial alignment with the lower row crop cutter mechanism 30. Again, such arrangement of the upper grain cutter mechanism 40 and the lower row crop cutter mechanism 30 as disclosed in the aforementioned Figures is to facilitate the simultaneous cutting and collection of the grain heads 3 and stalks or cane 2 of a plant 1.

Figure 4:
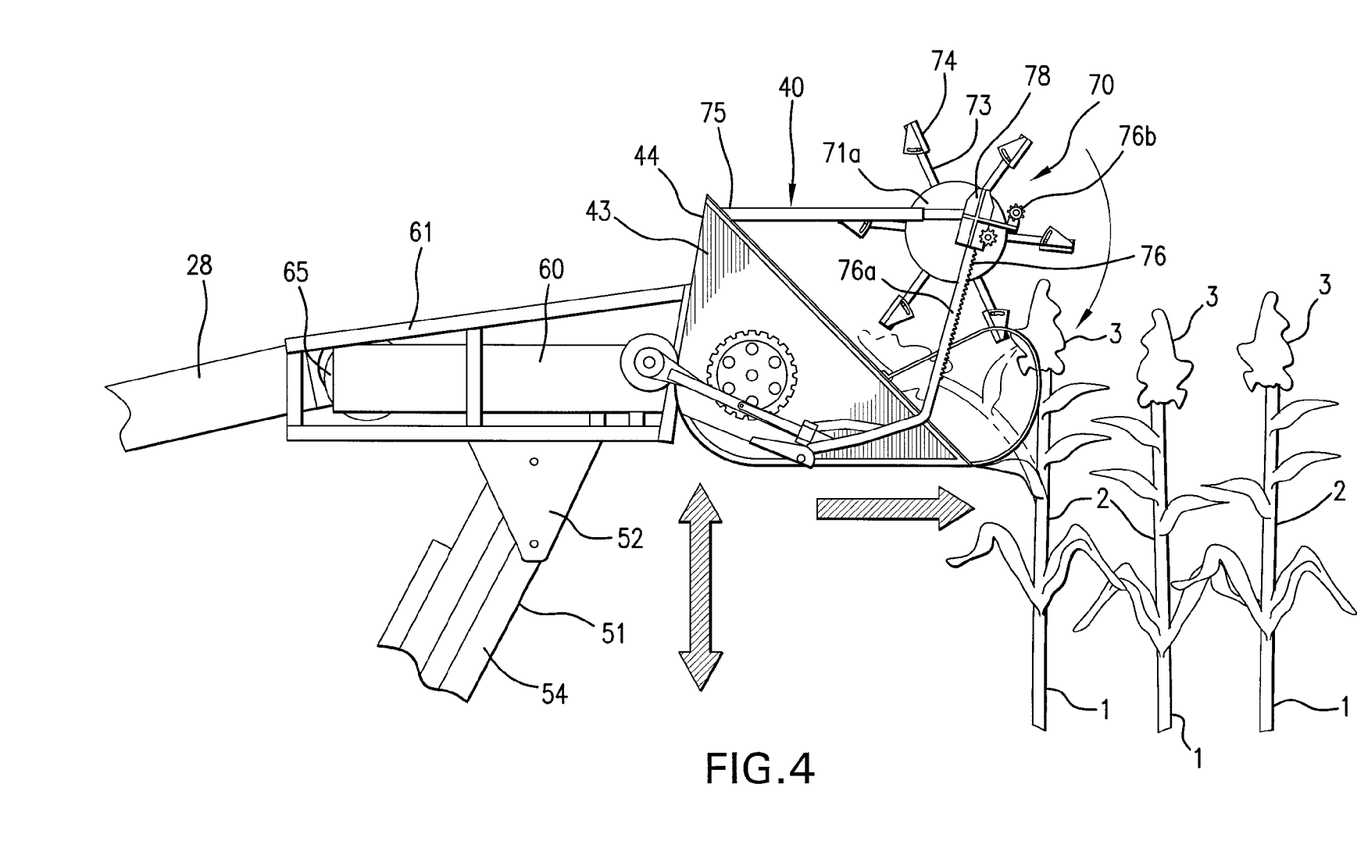
FIG. 4 is a partially cut-away view of the upper grain cutter mechanism of the present invention.

FIG. 4 illustrates the overall purpose of the plant positioning mechanism 70. Inasmuch as a primary goal of the invention is to harvest plants having a grain head 3 and a stalk or cane 2, such as sorghum, simultaneously in a single field pass, the plant positioning system 70 is helpful in properly maintaining grain heads 3 in a position necessary for maximizing optimal and efficient harvesting of grain and cane. Specifically, the plant positioning mechanism 70 rotates about a central axis defined as the crossbar 72 of the revolving reel. As the revolving reel 71 of the plant positioning mechanism 70 rotates about a central axis, in a clockwise direction, the paddles 74 of the revolving reel 71 contact and push the grain heads 3 of the plant 1 into the blades of the sickle mower 41.

As can be further seen in FIG. 4, the displaceable linkage mechanism 51 is displaceable in a rotary direction such that the upper grain cutter mechanism 40 can be positioned in such a way as to shear off the grain heads 3 of the plant 1 and further ensure that the paddles 74 of the revolving reel 71 are able to sufficiently contact the grain heads 3 and pull them into the sickle mower 41 of the upper grain cutter mechanism 40. The displaceability of the displaceable linkage mechanism 51 ensures that the upper grain cutter mechanism 40 can be oriented to remove the grain heads 3 of the plant 1 irrespective of plant height. FIG. 4 also illustrates that the paddles 74 of the revolving reel system 71 are able to sufficiently salvage the remaining portion of the plant 1 once the grain heads 3 are sheared from the plant 1; namely, the remainder of the stalks or canes 2.

Additionally, as seen in FIG. 4, the multiple paddles 74 on the revolving reel 71 allow the upper grain cutter mechanism 40 to quickly process the next grain head 3 of succeeding plant 1. In this manner, the plant positioning mechanism 70 provides for an effective way to harvest grain heads 3 of plants which are or are similar to sorghum plants. FIG. 4 further illustrates the ability to independently move the plant positioning mechanism 70 relative to the sickle mower 41 of the upper grain cutter mechanism 40. The embodiment of the upper grain cutter mechanism 40 as shown in FIG. 4 employs two pairs of plant positioning connection rods 75; namely, an upper pair of plant positioning connection rods 75a and a lower pair of plant positioning connection rods 75b. The upper and lower pair of plant positioning connection rods 75a, 75b respectively, are matingly engaged with a coupling 78 coupled to the outer walls 71a of the revolving reel 71 at one end and further connected to at least the collection bin 42, or alternatively, the blower housing frame 61.

In this arrangement, the upper pair of plant positioning connection rods 75a are coupled to the outer walls 71a of the revolving reel 71 and the back wall 44 of the upper grain cutter mechanism 40 respectively. In this manner, the revolving reel can be reversibly extended with respect to its position relative to the sickle mower 41 of the upper grain cutter mechanism 40. Such an arrangement allows the user of the harvester 10 to efficiently capture and cut each and every grain head 3 in spite of however close or distant each individual plant is from the next. The upper pair of plant positioning connection rods can be extended through hydraulic or mechanical actuation.

Similarly, the revolving reel 71 can be vertically adjusted independent of the displaceable linkage mechanism 51 as the lower pair of plant positioning connection rods 75b employ a rack and pinion like system 76 to enable a user to raise or lower the plant positioning mechanism 70 independent of the upper grain cutter mechanism 40. In this manner, a user of the harvester 10 can employ the height adjustment mechanism 50 to position the upper grain cutter mechanism at a location just beneath the grain head 3 of a plant 1. Further, the user of the harvester can independently position the plant positioning mechanism 70 to ensure that only the grain heads 3 of the plant 1 are being driven into the blades of the sickle mower 41. The independent variability of the upper grain cutter mechanism 40 and the plant positioning mechanism 70 allow for optimal and efficient harvesting of grain heads 3 and stalks or canes 2.

Figure 5:
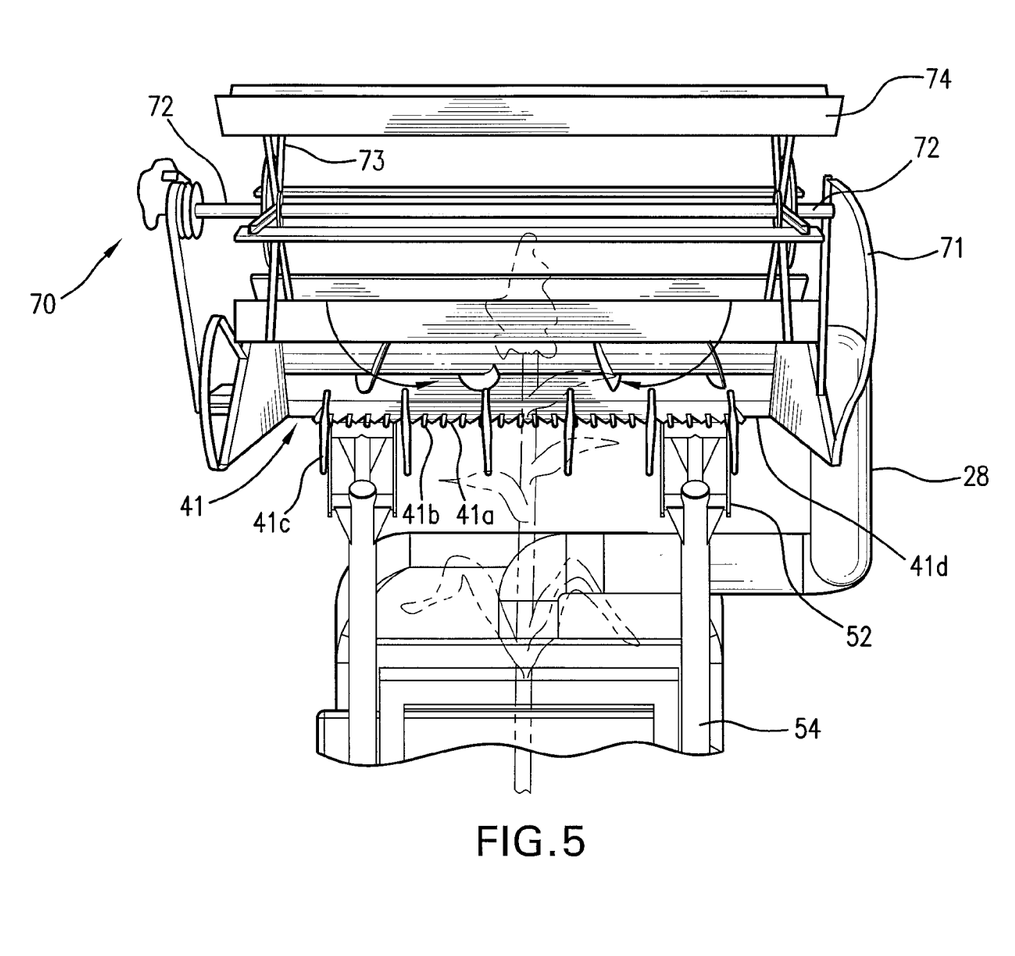
FIG. 5 is a partial frontal cut-away view of the upper grain cutter mechanism of the present invention.

FIG. 5 illustrates a frontal view of the upper grain cutter mechanism 40 and the attached plant positioning mechanism 70. As is clearly seen, upper grain cutter mechanism 40 includes a sickle mower 41, more commonly referred to as reciprocating mowers, bar mowers, or finger-bar mowers. Sickle mower 41 includes reciprocating blades 41a, stationary fingers 41b, and guard teeth 41c shown in FIG. 6. The stationary fingers 41b are mounted on a bar 41d having additional stationary guard teeth 41c positioned thereon. The bar 41d has a channel (not shown) disposed thereon for receiving a reciprocating sickle having reciprocating blades 41a. The reciprocating sickle is driven rapidly along the channel causing the grain head 3 of the plant 1 to be cut between the sharp edges of the reciprocating blades 41a and the stationary fingers 41b.

Guard teeth 41c assist in keeping the stalk or cane 2 of the plant 1 within the sickle mower 41. Additionally, the paddles 74 of the revolving reel 71 ensures that the grain head 3 of the plant 1 is guided into the sickle mower 41. Additional mechanisms by which sickle mowers can operate are through the passage of reciprocating blades 41a through slits 41e formed within stationary fingers 41b. Pursuant to this configuration, the sickle bar 41d will quickly move the reciprocating blades 41 through the slits 41e formed within the stationary blades 41b. Again, this configuration employs a method of cutting similar to that previously mentioned inasmuch as the grain head 3 of the plant 1 will be cut between the reciprocating blades 41a and stationary fingers 41b of sickle mower 41.

FIG. 6 details the operation of the sickle mower 41 of the upper grain cutter mechanism 40. Specifically, the plant 1 is guided between the guard teeth 41c. As the stalk or cane 2 of the plant 1 is driven into the sickle mower 41, the bar 41d, including reciprocating blades 41a, rapidly reciprocates in a back and forth direction through slits 41e formed within stationary fingers 41b. When actuated, the bar 41d including the reciprocating blades 41a will pass through a hole 43a in sidewall 43 of the collection bin 42 of the upper cutter mechanism 40. Once the grain head 3 of the plant 1 is removed from the stalk or cane 2, the auger blades 47 will rotate about the axis of the rotating auger shaft 48 to drive the grain heads 3 through opening 45 formed within the back wall 44 of the collection bin 42.

Figure 7:
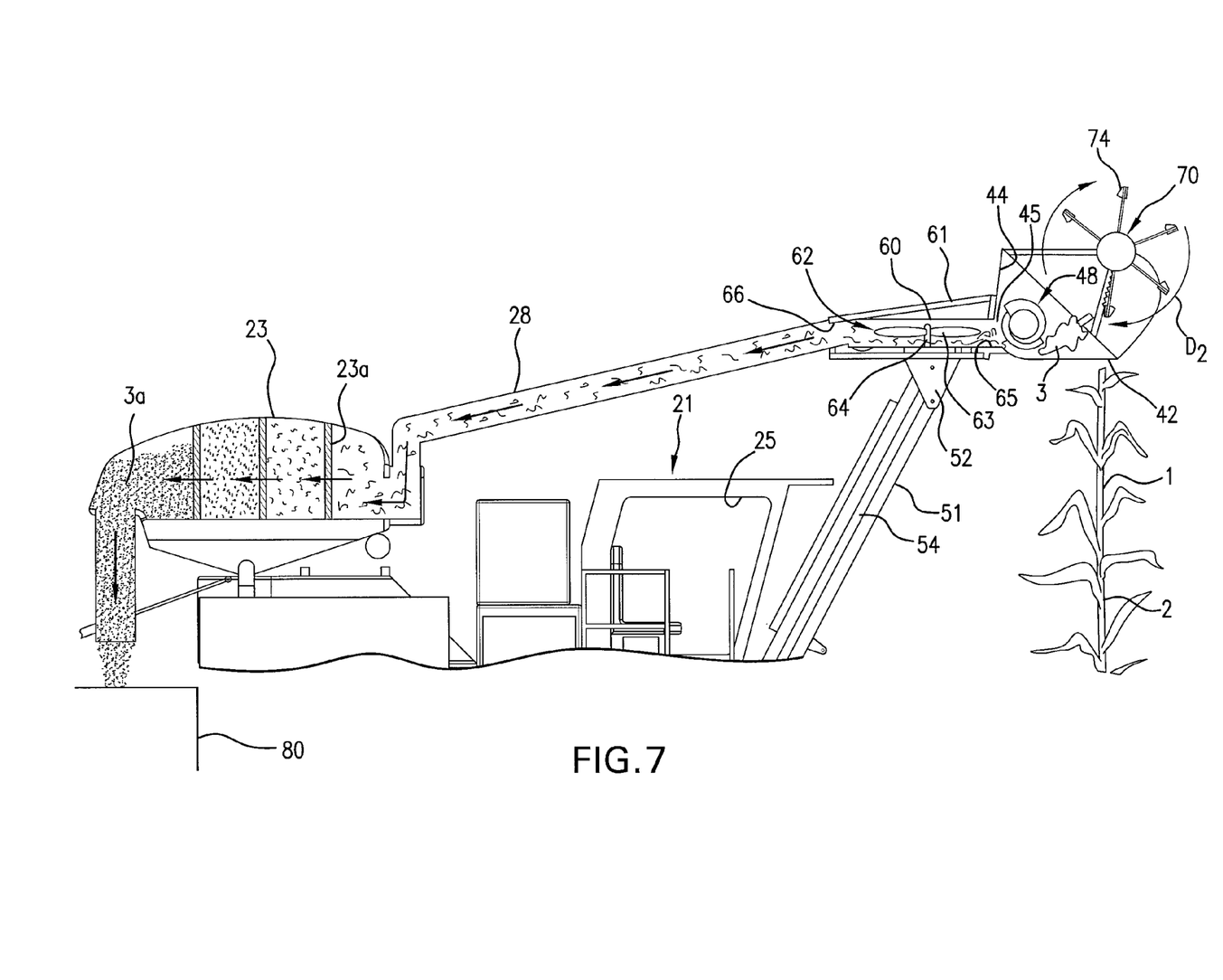
FIG. 7 is a schematic side elevational view of the harvester removal and threshing of a grain head by the upper grain cutter mechanism and thresher of the harvester of the present invention.

FIG. 7 is a general schematic illustrating the removal of the grain head 3 from a plant 1 by the upper grain cutter mechanism 40. As is illustrated by FIG. 7, the grain head 3 is sheared off of the plant stalk 2 upon depression of the grain head 3 into the sickle mower 41 by the paddles 74 of the plant positioning mechanism 70. Once the grain head 3 has been sheared from the stalk or cane 2 of the plant 1, the grain head 3 is then guided by the auger blades 47 of the auger assembly 46 through the opening 45 of the collection bin 42. The blower 60 is mounted to a blower housing frame 61 and the upper grain cutter mechanism 40 is coupled to the blower housing frame 61. Specifically, the back wall 44 of the collection bin 42 is connected to the housing frame 61 permitting the opening 45 formed within the back wall 44 of the collection bin 42 to be in open communication with the blower 60.

In the embodiment shown in FIG. 7, the blower is a fan or rotary blade blower 62 having a plurality of fan blades 63 oscillating about a central fan axis 64. As the opening 45 is in open communication with the blower 60, the freshly cut grain head 3 is guided through the opening 45 formed within the back wall 44 of the collection bin 42 by the auger assembly 46 and through the intake port 65. As the fan blades 63 rotate, air is forced forward towards the exhaust port 66. As air is moved forward by the fan 62, a difference in air pressure occurs. This difference in air pressure causes a pressure drop behind the fan blades 63 at the intake port 65. As the pressure level in the area behind the fan drops below the level outside the blower, a partial vacuum creating suction is obtained. As the ambient air drives into the blower 60 through the opening 45 formed within the back wall of the collection bin 42 and further through the intake port 65 of the blower 60, the air pressure inside the blower is lower than the pressure outside of the blower. As such, the grain head 3 is sucked at a high velocity to the thresher 23 as the fan or rotary blade blower 62 has provided a pressure drop from the opening 45 to the conduit 28 which is in open communication with the exhaust port 66 of the blower 60.

The conduit 28 is in further open communication with the thresher 23. As the grain head 3 travels through the blower 60 and through the conduit 28 to the thresher 23, the grain 3a is separated from the grain head 3 and as the grain head 3 enters the thresher 23 through the conduit 28 the grain head 3 immediately encounters rasp bars (not shown) which thresh or separate the grains 3a and chaff. Rasp bars are typically grooved steel bars bolted to a rotating threshing drum (not shown). As the grain 3a separates from the chaff following passage through the rasp bars, the grain is further separated from the chaff through the action of the rotating threshing drum against a concave, also known as a "half drum" (not shown). The concave is also fitted with steel bars and a series of meshed grills and shaker screens 23a. The desired grain 3a will be passed into a hopper 80 and the chaff, or unwanted material, will be expelled from the harvester 10. The hopper 80 can be an attached storage bin or any wagon, tractor or truck capable of driving next to the harvester 10 and collecting the grain 3a. Typically, the hopper 80 will be a gravity wagon or slant wagon which is towed by a tractor and utilizes gravity to assist in the unloading of grain.

FIG. 8 is a frontal view of the harvester 10 operating to cut a plant 1 simultaneously at two separate and distinct locations on the plant 1; namely, the grain head 3 at an upper section of the plant 1 and the stalk or cane 2 at a lower section of the plant 1. As is further shown in FIG. 8, the lower row crop cutter 30 is a three-row crop header having four grain platforms 30a. The grain platforms 30a gather stalks or canes 2 into the lower row crop cutters 30 through the cutting channels 34 located between each individual platform 30a. Once the stalk or cane 2 of the plant 1 is received within the cutting channel 34, grabbing chains 33 pull the stalk or cane 2 of the plant 1 into contact with the oscillating knife bar 32. The oscillating knife bar 32 cuts at a very high velocity. Following the stalk or cane 2 of the plant 1 being cut by the oscillating knife bar 32, the stalk or cane 2 will hit off guide bar 31 and be lead into the feeder throat or feed house 36 located within the combine machine 20 and directly behind the lower row crop cutter 30. Once the stalk or cane 2 of the plant 1 is pulled into the machine, pinch rollers will pull the stalk or cane 2 into the belly of the machine and place the stalk or cane 2 onto at least one conveyor 35 for movement into the tassel collection hopper 24. Once the stalk or cane 2 is moved within the machine, a rotating knife (not shown) will slice each individual stalk or cane 2 into 6-8 inch sections called billets.

Figure 9:
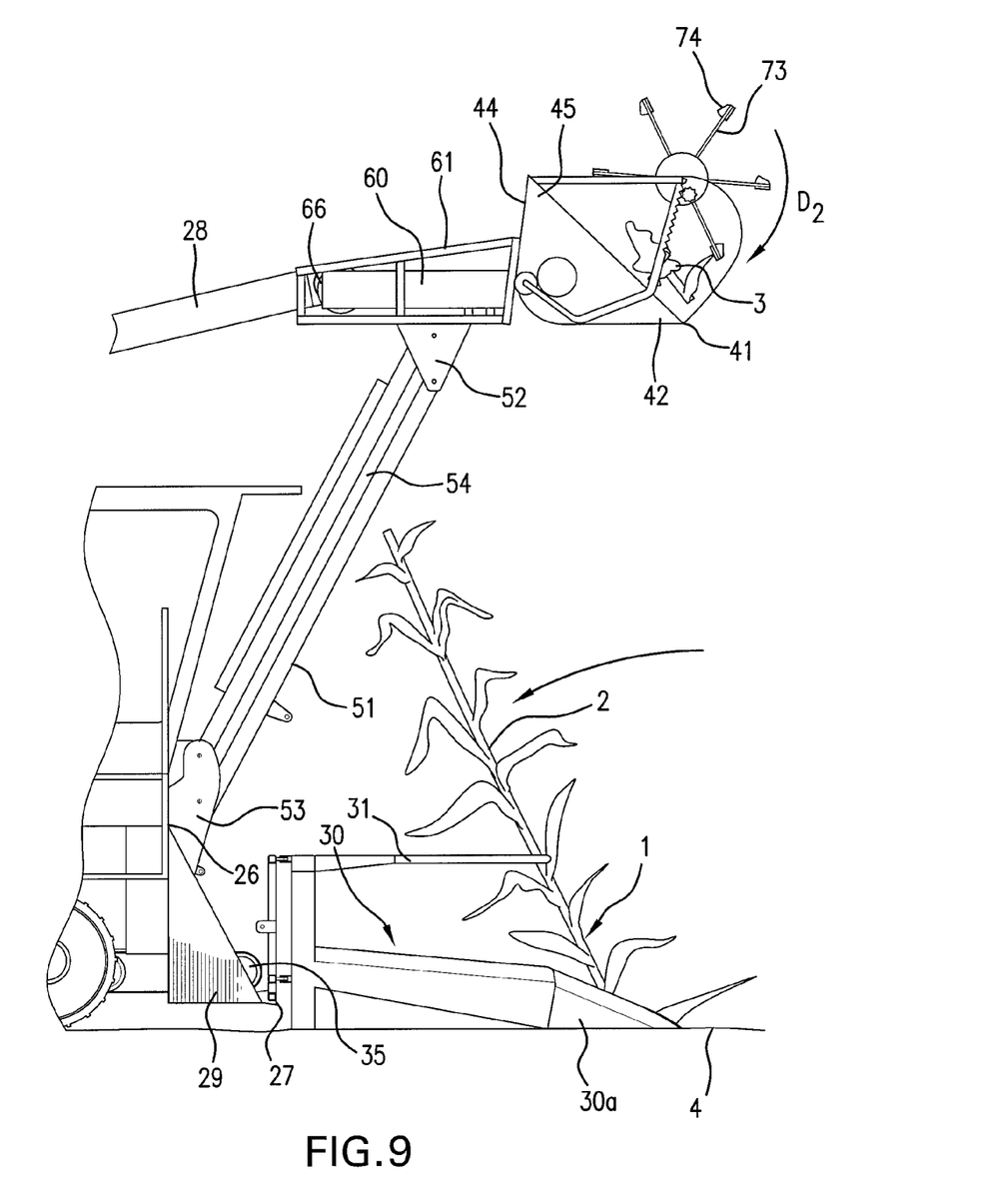
FIG. 9 is a schematic illustration of the simultaneous cutting of a grain head and stalk by the upper grain cutter mechanism and lower row crop cutter mechanism respectively of the present invention; and, FIG. 10 is a schematic view of the overall concept of the harvester of the present invention.

FIG. 9 shows the plant 1 being simultaneously cut closely near the ground 4 by the lower row crop cutter mechanism 30 and the grain head 3 being cut from the stalk or cane 2 by the upper grain cutter mechanism 40. The cane or stalk 2 will be guided by the guide bar 31 of the lower row crop cutter mechanism 30 into the feeder through or feed house 36 and the grain head 3 will be guided by the auger assembly through an opening 45 formed within the back wall 44 of the upper grain cutter mechanism 40 to a blower 60 for rapid delivery to the thresher 23 via conduit 28. In FIG. 9, the upper grain cutter mechanism 40 is coupled to the lower section 26 of the combine vehicle 20 and is vertically displaced from the lower row crop cutter 30 for simultaneous cutting of the grain head 3 and from the stalk or cane 2 and the stalk or cane 2 at a location on the plant close to the ground 4.

Figure 10:
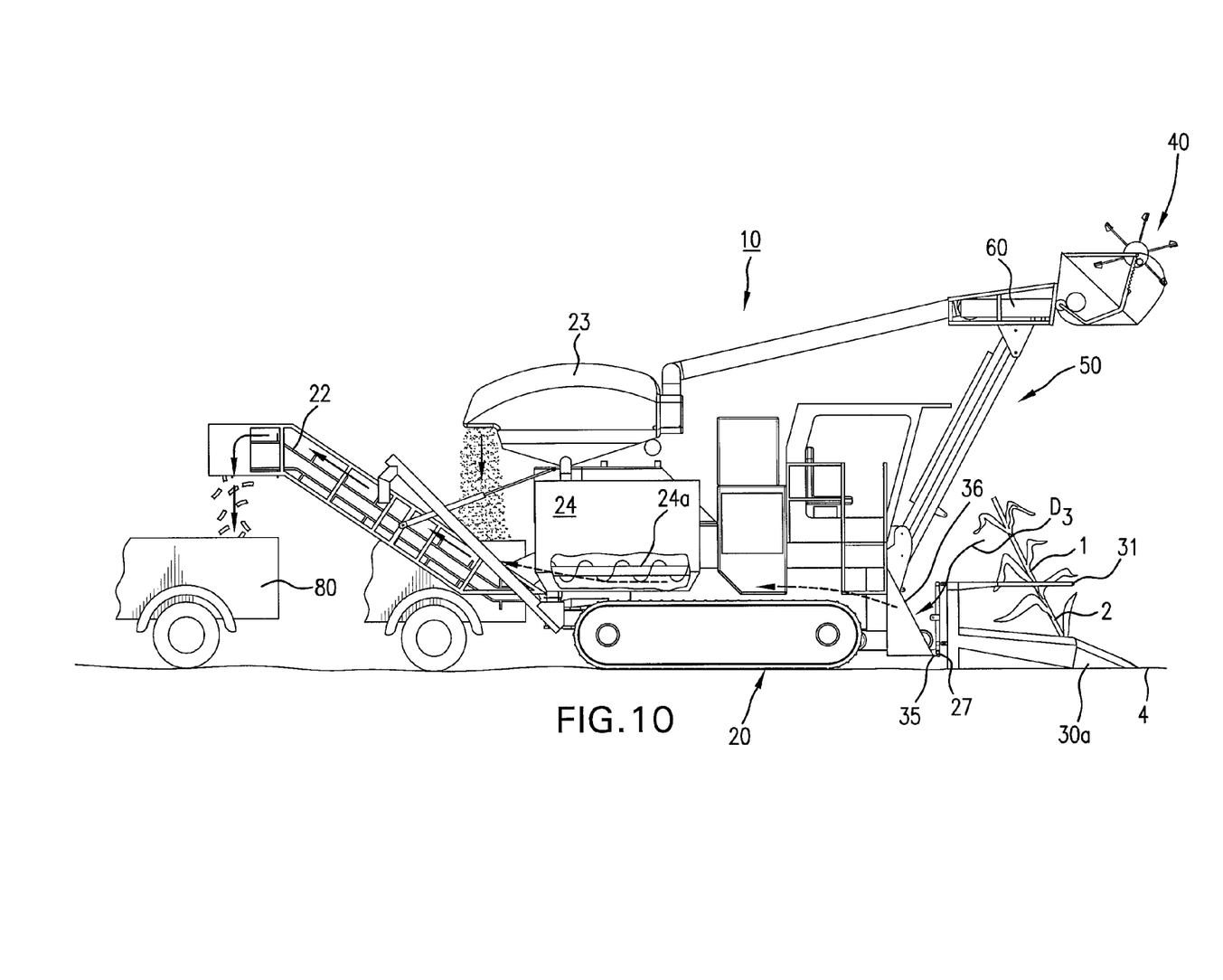

In FIG. 10 the stalk or cane 2 of the plant 1 is seen to be harvested simultaneously following removal of the grain head 3 from the plant 1. As is illustrated, the stalk or cane 2 of the plant 1 is cut as it enters the channels 34 between grain platforms 30a of the lower row crop cutter mechanism 30. After being cut by the oscillating knife bar 32 of the lower row crop cutter mechanism 30, the stalk or cane 2 of the plant 1 falls in a forward direction $D_3$ and is guided by the guide bar 31 of the lower row crop cutter mechanism 30 into the feeder throat or feed house 36 of the combine vehicle 20. The harvested stalk is lead into the feeder throat 36 of the combine vehicle 20 by a series of conveyors 35 located almost immediately behind the lower row crop cutter mechanism 30.

Once the stalks or canes 2 are loaded onto the conveyors 35, the cane or stalk 2 is carried into the tassel collection hopper 24 where the stalk or cane 2 is processed by a rotating knife (not shown). The rotating knife will slice the stalk or cane 2 into 6-8 inch billets which will eventually be fed through the tassel collection hopper 24 by the hopper discharge screw 24. After passing through the tassel collection hopper 24, the billets are loaded onto the main body discharge conveyor 22. From there, the billets are transported from the main body discharge conveyor 22 of the combine vehicle 20 into an additional hopper moving with the combine vehicle 20. The billets are now collected and ready to be transported to an offsite processing facility. Additionally, the valuable grain 3a has been separately collected and harvested. Both of these steps are completed seamlessly in a single field pass by the present invention.

Although this invention has been described in connection with specific forms and embodiments thereof, it will be appreciated that various modification other than those discussed above may be resorted to without departing from the spirit or scope of the invention as defined in the appended Claims. For example, equivalent elements may be substituted for those specifically shown and described, certain features may be used independently of other features, and in certain cases, particular applications of elements may be reversed or interposed, all without departing from the spirit or scope of the invention as described in the appended Claims.

What is being claimed is:

1. A harvester adapted for harvesting a plant having a stalk and a grain head comprising:
   a combine vehicle;
   a lower row crop cutter mechanism mounted to a connecting section of said combine vehicle for cutting the plant stalk at a lower end of the plant;
   an upper grain cutter mechanism coupled to a lower section of said combine vehicle and being vertically displaced from said lower row crop cutter mechanism, said upper grain cutter mechanism including an elongate blade portion and a plant positioning mechanism, said plant positioning mechanism defining a paddle structure rotatable about an axis substantially parallel to said blade portion to urge the plant thereagainst for cutting the grain head at an upper end of the plant simultaneously with the cutting of the plant stalk by said lower row crop cutter mechanism, said upper grain cutter mechanism further including a blower in open communication with an opening formed within a back wall of a collection bin for receiving and displacing the grain heads of the plant external to said combine vehicle.

2. The harvester as recited in claim 1 wherein said upper grain cutter mechanism further includes a height adjustment mechanism.

3. The height adjustment mechanism as recited in claim 2 wherein said height adjustment mechanism further includes a displaceable linkage mechanism mounted on opposing ends to said lower section of said combine vehicle and said upper grain cutter mechanism and having at least one linkage bar disposed therebetween.

4. The displaceable linkage mechanism as recited in claim 3 wherein said displaceable linkage mechanism is displaceable in a rotary direction and reversibly extendable along a longitudinal axis of said at least one linkage bar.

5. The harvester as recited in claim 4 wherein said reversible extendibility of said at least one linkage bar is hydraulically actuated.

6. The harvester as recited in claim 1 wherein said upper grain cutter mechanism further includes a plurality of reciprocating cutter blades for cutting the grain head at an upper end of the plant.

7. The harvester as recited in claim 1 wherein said plant positioning mechanism is rotatable about the axis.

8. The harvester as recited in claim 7 wherein said plant positioning mechanism further includes a plurality of paddles each radially offset from the revolving reel, said paddles being rotatable about the axis.

9. The harvester as recited in claim 1 wherein said upper grain cutter mechanism further includes an auger assembly rotatably coupled to side walls of said collection bin.

10. The harvester as recited in claim 9 wherein said auger assembly further includes an auger shaft and at least one auger blade for guiding the grain heads of the plants through said opening of said collection bin.

11. A harvester adapted for harvesting a plant having a stalk and a grain head comprising:
  a combine vehicle;
  a lower row crop cutter mechanism mounted to a connecting section of said combine vehicle for cutting the plant stalk at a lower end of the plant;
  an upper grain cutter mechanism being coupled to a lower section of said combine vehicle said upper grain cutter mechanism including a collection bin having an opening formed within a back wall thereof;
  said upper grain cutter mechanism being vertically displaced from and in substantial alignment with said lower row crop cutter mechanism, said upper grain cutter mechanism including an elongate blade portion; a plant positioning mechanism, said plant positioning mechanism defining a paddle structure rotatable about an axis substantially parallel to said blade portion to urge the plant thereagainst for cutting said grain head at an upper end of said plant simultaneously with said cutting of said plant stalk by said lower row crop cutter mechanism, and a blower, said blower in open communication with said opening for receiving and displacing the grain heads of the plants to a thresher mounted to said combine vehicle.

12. The harvester as recited in claim 11 wherein said upper grain cutter mechanism further includes a height adjustment mechanism.

13. The harvester as recited in claim 12 wherein said height adjustment mechanism further includes a displaceable linkage mechanism mounted on opposing ends to said lower section of said combine vehicle and said upper grain cutter mechanism and having at least one linkage bar disposed therebetween.

14. The harvester as recited in claim 13 wherein said displaceable linkage mechanism is displaceable in a rotary direction and reversibly extendable along a longitudinal axis of said at least one linkage bar.

15. The harvester as recited in claim 14 wherein said reversible extendibility of said at least one linkage bar is hydraulically actuated.

16. The harvester as recited in claim 11 wherein said upper grain cutter mechanism further includes a plurality of reciprocating cutter blades for cutting the grain head at an upper end of the plant.

17. The harvester as recited in claim 11 wherein said plant positioning mechanism includes a revolving reel rotatable about the axis.

18. The harvester as recited in claim 17 wherein said plant positioning mechanism further includes a plurality of paddles each radially offset from the revolving reel, said paddles being rotatable about the axis.

19. The harvester as recited in claim 11 including a blower housing frame connected to said back wall of said collection bin for mounting said blower thereon.

20. The harvester as recited in claim 19 wherein said blower housing frame is coupled to said combine vehicle.

21. The harvester as recited in claim 20 including an upper vehicle bracket connected to a lower wall of said blower housing frame and said height adjustment mechanism.

22. The harvester as recited in claim 21 wherein said upper vehicle bracket is rotatable with respect to said height adjustment mechanism.

23. The harvester as recited in claim 22 wherein said harvester includes a lower vehicle bracket connected to said combine vehicle.

24. The harvester as recited in claim 23 wherein said blower is a rotary blade blower for providing a pressure drop from said opening to a conduit in open communication with said blower for passage of the grain therethrough.

25. The harvester as recited in claim 24 wherein said blower and said thresher are in communication through a conduit.

\* \* \* \* \*